US006783665B1

(12) United States Patent
Girondi

(10) Patent No.: US 6,783,665 B1
(45) Date of Patent: Aug. 31, 2004

(54) UNIT FOR AUTOMATICALLY BLEEDING OFF THE WATER WHICH SEPARATES IN A VEHICLE FUEL FILTER, IN PARTICULAR FOR DIESEL ENGINES

(75) Inventor: Giorgio Girondi, Monaco (IT)

(73) Assignee: UFI Universal Filter International S.p.A., Nogarole Rocca (IT)

( * ) Notice: Subject to any disclaimer, the term of this patent is extended or adjusted under 35 U.S.C. 154(b) by 0 days.

(21) Appl. No.: 10/129,085

(22) PCT Filed: Oct. 20, 2000

(86) PCT No.: PCT/IB00/01527

§ 371 (c)(1),
(2), (4) Date: May 2, 2002

(87) PCT Pub. No.: WO01/33069

PCT Pub. Date: May 10, 2001

(30) Foreign Application Priority Data

Oct. 3, 1999 (IT) .......................... RE99A0109

(51) Int. Cl.[7] .......................... F02M 37/22; G01F 23/12
(52) U.S. Cl. .......................... 210/86; 210/114; 210/123; 210/167; 210/232; 210/416.4; 340/624
(58) Field of Search .......................... 210/86, 85, 109, 210/112, 114, 123, 128, 143, 171, 172, 167, 168, 232, 257.1, 258, 416.4, 416.5, DIG. 5, 533; 137/172, 204, 558; 123/198 DB, 196 A; 340/624

(56) References Cited

U.S. PATENT DOCUMENTS

| 3,249,229 A | * | 5/1966 | Kasten .................... 210/195.1 |
| 3,868,321 A | * | 2/1975 | Gough .......................... 210/86 |
| 3,931,011 A | | 1/1976 | Richards et al. |
| 4,447,321 A | * | 5/1984 | Jackson ........................ 210/86 |
| 4,491,143 A | | 1/1985 | Yasuhara |
| 4,898,140 A | * | 2/1990 | Pages .......................... 123/510 |
| 5,643,446 A | * | 7/1997 | Clausen et al. ............. 210/184 |
| 5,880,674 A | * | 3/1999 | Ufkes et al. ................ 340/438 |

FOREIGN PATENT DOCUMENTS

| DE | 44 09 570 | 5/1995 |
| EP | 0 337 861 | 10/1989 |
| GB | 2 065 336 | 6/1961 |

* cited by examiner

Primary Examiner—Terry K. Cecil
(74) Attorney, Agent, or Firm—Browdy and Neimark, P.L.L.C.

(57) ABSTRACT

The unit includes a sensor means (20) positioned in the collection chamber to undergo activation when the water level reaches a predetermined maximum value; there is also provided an electrically operated withdrawal device (30) connected to the vehicle electrical system, to withdraw the water separated within the collection chamber through the bleed outlet, or to close the outlet; a microprocessor (40) is also provided, connected to the sensor (20) and to the switch (50) of the vehicle electrical power system, to electrically power the withdrawal device (30) when the sensor (20) is activated and the ignition key is in a first activation position (I).

9 Claims, 2 Drawing Sheets

UNIT FOR AUTOMATICALLY BLEEDING OFF THE WATER WHICH SEPARATES IN A VEHICLE FUEL FILTER, IN PARTICULAR FOR DIESEL ENGINES

TECHNICAL FIELD

This invention relates to a unit for automatically bleeding off the water which separates in a vehicle fuel filter, in particular for diesel engines, and is applied to a vehicle the electrical system of which has a switch means operated by the ignition key and having a first activation position in which the system is activated but the engine remains switched off.

BACKGROUND ART

The fuel in motor vehicles is usually filtered before being fed to the engine.

As the water present in the fuel tends to damage by oxidation the metal parts with which it comes into contact, it has been known for some time to use filters, in particular for diesel engine fuel (gasoil), which besides removing the impurities, separates the water parts present in the fuel.

As the water has a higher specific gravity than the fuel, it collects on the bottom of a chamber positioned in the lower part of the filter.

This water has to be bled off when it reaches a maximum level, to prevent it Interfering with the proper operation of the filter, but is sometimes returned to the fuel stream leaving the filter. In some filters a device is provided to visually indicate, on the vehicle dashboard, the attainment of said maximum level.

The bleeding operation is carried out manually by opening an appropriate outlet port provided on the base of the collection chamber, this operation having necessarily to be effected with the engine switched off; otherwise, given that the filter operates under either vacuum or pressure, opening the discharge port would create unbalance in its interior, which would prevent correct bleeding of the water and would also cause malfunction of the filter itself (water drawn towards the engine or fuel expelled through the discharge).

The bleeding operation is very uncomfortable because, when the warning lamp lights, the driver has to stop the vehicle, descend from it, gain access to the filter (typically positioned in the engine compartment), open the bleed outlet and wait for the water to descend, which can require a relatively long time, especially if the filter operates under vacuum.

The main object of the present invention is to automatically effect bleeding in order to avoid said relatively lengthy and uncomfortable manual operations.

DISCLOSURE OF THE INVENTION

This and further objects are attained by the invention as characterised in the claims.

The invention is based on the fact of comprising:
- a sensor means positioned in the collection chamber to undergo activation when the water level reaches a predetermined maximum value;
- an electrically operated withdrawal device connected to the vehicle electrical system, to withdraw the water separated within the collection chamber through the bleed outlet, or to open and close said outlet;
- a microprocessor connected to said sensor means and to the vehicle electrical power system, to make the connection between the vehicle battery and the withdrawal device in order to operate this latter, when the sensor means is activated and the ignition key is in a first activation position.

It should be noted that vehicles already comprise a connector to be connected to known filters comprising a water level sensor. Because of the presence of said connector, the invention enables a disposable filter to be produced, the shell of which can be provided with, or associated with, processor-operated water withdrawal means or water discharge means powered by the vehicle electrical system and connected by the existing connector to the control means on the vehicle.

The pump unit or the water discharge means can be permanently associated disposably with the filter shell, or be permanently fixed to the vehicle and easily fitted into the shell.

The invention is described in detail hereinafter with the aid of the accompanying figures which illustrate one embodiment thereof by way of non-limiting example.

Figure 1:
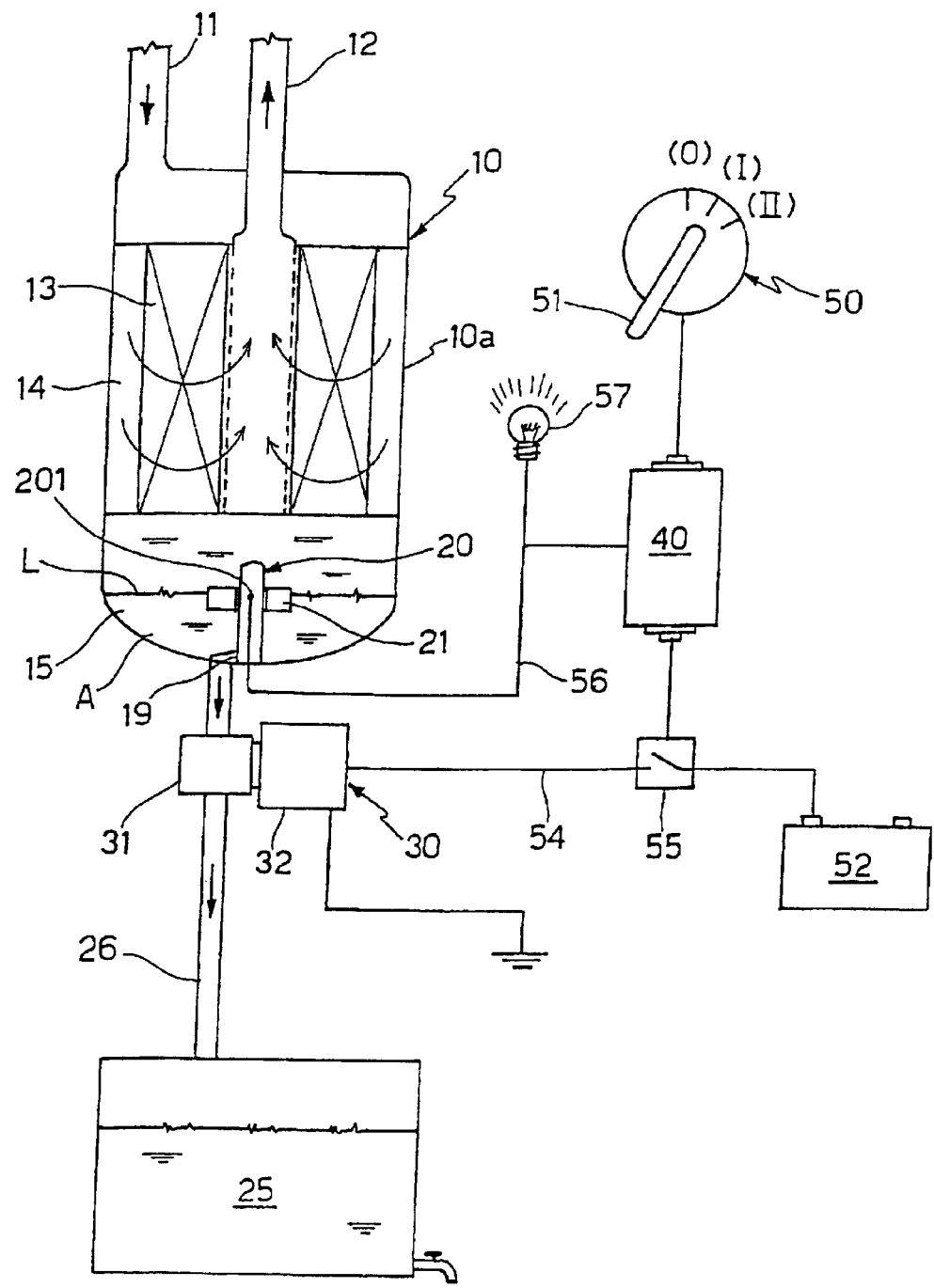
FIG. 1 is a schematic illustration of the unit of the invention.
Figure 2:
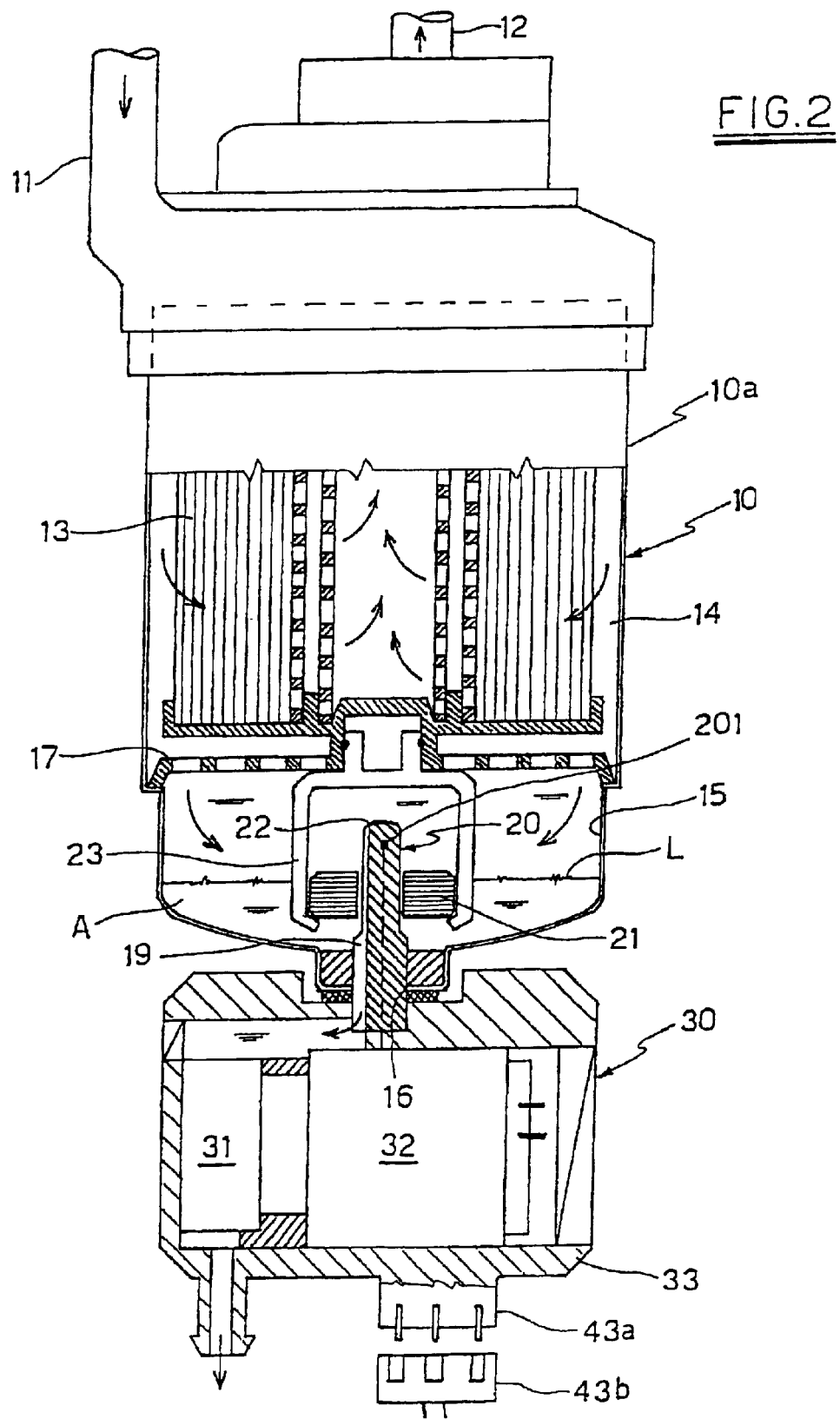
FIG. 2 is a more detailed partly sectional view of the filter and of some elements of the unit of FIG. 1.

The unit of the invention is applied to a filter 10, substantially of known type, having an inlet 11 and outlet 12 and a filter means 13 positioned in an upper chamber 14. The fuel enters the chamber 14 through the inlet and, after passing through the filtering means 13, leaves through the outlet 12.

Below the chamber 14 and communicating therewith there is positioned a chamber 15 separated from the first by a perforated base; the chamber 15 serves for collecting the water separated from the fuel by the filtering means 13 (or by other devices). The entire chamber 15 is hence full, containing fuel in its upper part and separated water which accumulates in its lower part. The filter 10 comprises a casing 10a containing at least one filtering means 13, the collection chamber 15 and part of the water level sensor. According to the invention, a sensor means 20 is positioned in the collection chamber 15 to be activated when the water level reaches a set maximum value.

In particular, the sensor means 20 comprises a float 21, the specific gravity of which lies between the specific gravity of the water and that of the fuel, and which is positioned in the collection chamber under the influence of the level of the water A which collects on the bottom; in detail, the float 21 is slidable along a vertical guide stem 22, which projects into the chamber 15 by passing through a lower port 16 positioned at the lowest point of the chamber 15 and closed by the stem 22 itself.

In the upper portion of the stem 22 there is positioned a sensor element 201 (for example of magnetic reed type) which is activated when the float 21, in moving upwards as the level L of the accumulated water gradually increases, arrives at the element 201 which closes a contact and emits an electric signal.

Below the chamber 15 there is connected to the filter 10 an electrically operated withdrawal device 30 arranged to withdraw the separated water from the collection chamber 15 through a bleed outlet 19 provided along the stem 22.

In particular, in the embodiment shown in the figures, said withdrawal device comprises a pump 31 operated by an electric motor 32 to draw the water from the collection chamber 15 and to feed it through a pipe 26 to a collection vessel 25 mounted on the vehicle.

Preferably, the motor 32 and pump 31 are grouped together and enclosed in a container 33 which is fixed to the lower end of the filter 10 at the port 16, and to which the lower end of the stem 22 is also fixed.

The unit of the invention is applied to a vehicle having a usual electrical system to which it is connected by the connector 43a, 43b, and which comprises a switch means 50 operated by the ignition key 51 having a deactivation position (0), a first activation position (I) in which the system is activated whereas the engine remains switched off, and finally a second activation position (II) in which the starter motor is operated. The electric motor 32 is connected to the accumulator 52 of the electrical system, in particular via a circuit 54 comprising a switch 55.

The unit of the invention comprises a microprocessor 40 which is connected to the sensor means 20 via a circuit 56, and to the switch means 50 of the vehicle electrical system, and which also controls the switch 55 to make and break the connection between the battery 52 and the motor 32 of the pump 31. The microprocessor 40 is arranged to make the connection between the battery 52 and the motor 32 when the sensor means 20 is activated and the ignition key 51 is positioned in said first activation position (I).

When activated, the sensor means 20 produces a signal which, besides being fed to the microprocessor 40, activates a visual signal (warning lamp) positioned on the vehicle instrument panel (dashboard).

The motor 32 and pump 31 are grouped together to form a single assembly with the microprocessor 40, all being enclosed within the container 33, which is screwed to the lower port 16 of the filter cartridge.

The float 21 forms part of the replaceable filter cartridge, and is enclosed and guided by a cylindrical wall 23 fixed upperly to the perforated base 17. In contrast, the vertical guide stem 22 is rigid with the assembly enclosed by the container 33 and projects into the collection chamber 15 by passing through the lower port 16 of the chamber 15, to close the port 16. When the assembly enclosed within the container 33 has been fixed to the filter 10 via the port 16, the float 21 is mounted on the stem 22 and subjected to the influence of the level of the water which collects on the bottom of the collection chamber 15, and is arranged to emit a signal when said level reaches a predetermined maximum value. The unit enclosed within the container 33 is provided with a male electrical connector element 43a suitable for connection to a female connector element 43b, usually present on the vehicle for connecting the microprocessor to the vehicle electrical system.

While the level of the water A is less than a predetermined value, the sensor means 20 remains inactive and no signal reaches the microprocessor 40.

When said level reaches a predetermined maximum value, the float 21 rises to excite the sensor element 201, which feeds a signal to the microprocessor 40 and also lights the warning lamp 57. If at this point the vehicle engine is running, the microprocessor 40 produces no effect on the filter as bleeding has to take place with the engine switched off.

However when the vehicle engine is at rest, moving the key 51 into position (I) merely activates the electrical system but without switching the engine on, and hence the warning lamp 57 also lights.

At this point the microprocessor 40 automatically closes the switch 55, to connect the battery 52 to the motor 32, which therefore operates the pump 31 so that this bleeds the water from the chamber 15 and feeds it to the vessel 25.

The connection between the battery 52 and the motor 32, for operating the pump 31, is maintained for a predetermined time period (for example 20 seconds), such as to enable all or nearly all the water collected in the chamber 15 to be bled off. While the pump 31 is in operation, the microprocessor 40 inhibits any command within the vehicle electrical system aimed at switching on the vehicle engine.

On termination of said time period, the microprocessor 40 again causes the switch 55 to open and halt the pump, and also resets the system. At this point the vehicle electrical system is released in the sense that the vehicle engine can be switched on. In a different embodiment (not show in the figures), usable if the filter 10 operates with fluid under pressure, the withdrawal device 30 comprises a normally closed solenoid valve applied to the bleed outlet 19, and connected to the vehicle battery 52 via said switch 55 operated by the microprocessor 40. When activated, this solenoid valve opens the bleed outlet 19 and then bleeds the water from the chamber 15 by virtue of the pressure present in the chamber.

The invention is suitable for further useful applications in addition to the aforestated.

In this respect, it possesses the special characteristic of controlling the water bleed remotely, hence the the invention can also be located in vehicle positions which are normally inaccessible.

For example, it is well known that a considerable quantity of water separates from the fuel directly within the fuel tank, and sometimes directly arrives at the fuel filter.

If desired, the invention enables water separator means to be inserted directly into the fuel tank upstream of the pump which feeds the fuel to the engine filter, and to automatically withdraw at intervals the separated water from said means in the aforesaid manner.

In this manner the quantity of water contained in the fuel reaching the engine filter is reduced to the extent of considering lengthening the time period between one and the next engine filter bleed operation.

What is claimed is:

1. A unit for automatically bleeding off the water which separates in a vehicle fuel filter of a vehicle having an engine, the vehicle having a switch operated by an ignition key and having a first activation position in which an electrical system of the vehicle is activated but the engine remains switched off, the unit comprising the following:

(a) a replaceable filter cartridge comprising a first container including
  (i) an upper chamber having a filter therein,
  (ii) a lower chamber separated from said upper chamber and configured to collect water that separates from fuel passing through said filter, said lower chamber having a lower port, and
  (iii) a water level sensor first part positioned within said lower chamber and comprising a float, the specific gravity of which lies between the specific gravity of the water and that of the fuel, said lower chamber including a means for retaining said float therein;

(b) a second container removably attached to said first container and including therein:
  (i) a water level sensor second part comprising a float guide stem rigidly joined to said container and extending through said lower port to slidingly engage said float,
  (ii) an electrically operated withdrawal device connected to the electrical system of the vehicle, and configured to withdraw water accumulated in the lower chamber through a bleed outlet provided along said stem; and (c) a microprocessor connected to said water level sensor second part and to the switch of the vehicle electrical power system, to electrically power the withdrawal device when the water level sensor is activated and the ignition key is in the first activation position, said water level sensor being configured such that upon replacement of said filter cartridge, said sensor first part remains with said filter cartridge and is disposed therewith, while said sensor second part remains with said second container.

2. A unit as claimed in claim 1, in which the second container also includes said microprocessor.

3. A unit as claimed in claim 1, in which the sensor positioned in the lower chamber undergoes activation when the water level reaches a predetermined maximum value.

4. A unit as claimed in claim 1, in which the withdrawal device is electrically powered to operate for a predetermined time period, sufficient to enable all the water collected in the lower chamber to be bled off.

5. A unit as claimed in claim 1, in which the withdrawal device is connected to a collection vessel mounted on the vehicle, to which water withdrawn from the lower chamber is fed.

6. A unit as claimed in claim 1, in which the withdrawal device comprises a pump arranged to draw the water from the lower chamber, and operated by an electric motor connected to the electrical system of the vehicle via a switch operated by the microprocessor.

7. A unit as claimed in claim 1 applied to a filter which operates with fluid under pressure, characterized in that the withdrawal device comprises a normally closed solenoid valve connected to the electrical system of the vehicle via a switch operated by the microprocessor, to open the bleed outlet for water evacuation from the lower chamber.

8. A unit as claimed in claim 1, in which said water level sensor, when activated, produces a visual signal positioned on the vehicle.

9. A unit as claimed in claim 1, in which, while the withdrawal device is in operation, the microprocessor inhibits any command within the electrical system of the vehicle aimed at switching on the vehicle engine.

* * * * *